[11] 3,615,745

[72] Inventors Aldo J. Cro...
 Lake Forest;
 Donald S. Kenney, Northbrook, Village;
 Richard B. Hasbrouck, Lake Forest, all of
 Ill.
[21] Appl. No. 805,877
[22] Filed Mar. 10, 1969
[45] Patented Oct. 26, 1971
[73] Assignee Abbott Laboratories
 North Chicago, Ill.

[54] ANTIMICROBIAL COATINGS AND METHOD USING DIIODOMETHYL SULFONES
 24 Claims, No Drawings

[52] U.S. Cl. .................................................. 106/15,
 96/88, 117/138.5, 260/29.6, 260/45.7, 260/45.9,
 260/556, 260/607, 424/33, 424/337
[51] Int. Cl. .................................................. A01n 9/12,
 A01n 21/00, C07c 147/08, C08f 45/64
[50] Field of Search .............................................. 260/607 A,
 556 E, 556 A, 607 A; 106/15 AF, 15 AF; 424/337

[56] References Cited
 UNITED STATES PATENTS
 2,484,489 10/1949 Craig ........................... 424/337

| | | | |
|---|---|---|---|
| | | | 424/337 |
| 3,465,044 | 9/1959 | Hirano et al. .................. | 424/337 |
| 3,471,570 | 10/1969 | Boesch et al. .................. | 260/607 |
| 2,127,400 | 8/1938 | Gibbs ........................... | 260/607 A |
| 2,470,077 | 5/1949 | Fincke ........................... | 260/607 A |
| 2,628,982 | 2/1953 | James ............................ | 260/607 A |
| 3,051,757 | 8/1962 | Johnston ....................... | 260/607 A |
| 3,061,645 | 10/1962 | Buchanan et al. ............. | 260/607 A |
| 3,066,166 | 11/1962 | Muth et al. .................... | 260/556 A |
| 3,338,779 | 8/1967 | Herschler et al. .............. | 260/607 A |
| 3,101,377 | 8/1963 | Bluestone et al. ............. | 260/607 A |
| 3,138,519 | 5/1964 | Riden et al. .................... | 106/15 AF |

FOREIGN PATENTS
 728,969 4/1955 Great Britain ................ 424/337

*Primary Examiner*—Julius Frome
*Assistant Examiner*—Arthur Koeckert
*Attorney*—Robert L. Niblack ABSTRACT: Application of a coating composition comprising halomethyl sulfones protects agricultural and industrial substrates against fungicidal and bacterial attack. Use of diiodomethyl sulfones is especially effective to protect latex paint films, textiles, seeds and growing crops.

ANTIMICROBIAL COATINGS AND METHOD USING DIIODOMETHYL SULFONES

This invention relates to a coating composition to protect potential host materials against attack by fungi and bacteria. It relates particularly to the protection of industrial products such as paint films, textiles and the like and to protection of agricultural products such as seeds and plants.

A large variety of industrial and agricultural goods are subject to deterioration and decay because of attack by bacteria and fungi. Polished surfaces may be injured, paint films are damaged and become unsightly when covered with the parasitic organism and textiles and wood are consumed. The presence of bacteria and fungi in paper mill systems, oil wells and jet fuels clog the filters and otherwise interfere with their circulation.

Agricultural products are susceptible to attack throughout most of their growth cycle, and as a result protective agents are required for seeds, growing stalks and plants. The protection of agricultural products is particularly difficult because of the need to provide an agent toxic to the parasitic plant which will not at the same time injure the host plant; this requires a high degree of selectivity in the protective agent. It is most difficult to predict which agents will attack the parasite without injuring the host and useful agents are most often discovered empirically.

It is an object of this invention, therefore, to provide a coating composition for applying a protective compound to industrial and agricultural substrates to inhibit attack by fungi and bacteria. It is a further object of this invention to provide a method for the use of such a coating composition. It is still a further object of this invention to provide a composition which will protect painted surfaces, textiles and seeds from bacterial and fungal attack.

These and other objects which will become apparent from the following description and examples are attained through the provision of a coating composition comprising a compound of the formula

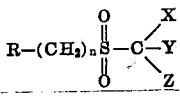

wherein R is alkyl, cycloalkyl, phenyl, loweralkylphenyl, monohalophenyl, anilino, anilamido, loweralkoxyphenyl, naphthyl, nitrophenyl, halonitrophenyl, nitroloweralkylphenyl, haloloweralkylphenyl, polyloweralkylphenyl and polyhalophenyl wherein the halogen is selected from the group consisting of fluorine, bromine and iodine, and $n$ is an integer from 0 to 4, when X, Y and Z have a total atomic weight greater than 110 and are selected from the group consisting of hydrogen and halogen. In addition, R may be polychlorophenyl when X, Y and Z have a total atomic weight greater than 250 and are selected from the group consisting of hydrogen and halogen. The term "loweralkyl" is intended to include those substituents having from one to seven carbon atoms. By "alkyl" is meant those substituents having from one to about 20 carbon atoms and additionally those alkyl groups having more than about 20 carbon atoms which do not substantially alter the essential activity or character of the remainder of the molecule.

The quantity of the compound employed and the concentration at which it is applied to protect the host material varies widely with the application and in some instances may be dictated by economic considerations. A quantity equal to from 0.1 percent to about 2 percent by weight may be employed in latex paint to protect not only the paint in the can prior to its application but also the film formed upon drying of the paint and the substrate upon which the paint has been coated. Application to a textile may be from a solvent which upon evaporation deposits more than about one-tenth of one percent to about 1 percent of a protective compound upon the textile fibers. When applying the compounds of this invention to seeds and growing plants, a coating of as little as 10 parts per million provides excellent protection although larger quantities up to about 6 ounces per bushel may be applied in certain circumstances.

The compositions may be employed in various types of formulations known to the art including solutions, emulsifiable concentrates, wettable powders, dusts and the like. The compounds likewise may be employed with other biocidal agents which occasionally may be desired to provide an optimum level of protection against the parasites expected to be encountered.

The compounds of the present invention are prepared by halogenating R-sulfonyl acetic acids with a sodium hypohalite in an alkaline aqueous solution followed by decarboxylation. The reaction may be represented as follows:

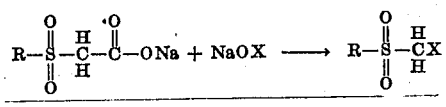

wherein X represents the halogen. The di- and trihalomethyl compounds may be similarly prepared by employing larger proportions of the halogenating reagent. In an alternative procedure, the aryl thioacetic acids may be halogenated with sodium hypohalite according to the following scheme in which oxidation of the sulfur to a sulfonyl group occurs in addition to the halogenation and decarboxylation indicated above;

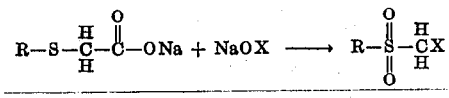

The following examples will illustrate the preparation of the compounds of this invention but should not be regarded as limiting.

EXAMPLE A p-BROMOPHENYL-DIBROMOMETHYL SULFONE p-Bromophenyl dibromomethyl sulfone was prepared by dissolving 19.5 (0.07 mole) of p-bromophenylsulfonyl acetic acid in 320 ml. of 5 percent aqueous sodium hydroxide solution which was chilled to less than 10° C. as 21.3 g. (0.133 mole) of bromine was slowly added. When addition was complete, the mixture was stirred in the cold another 2 hours and at room temperature overnight. The solid which formed was filtered and air-dried to yield 26.7 g. of p-bromophenyl-dibromomethyl sulfone melting at 118–121° C. It could be crystallized from dilute ethanol. Calculated for $C_7H_5Br_3O_2S$:
C=21.40%; H=1.28%; Br=61.02%
Found:   C=21.64%; H=1.23%; Br=60.94%

EXAMPLE B p-BROMOPHENYL-TRIBROMOMETHYL SULFONE p-Bromophenyl-tribromomethyl sulfone was prepared according to the procedure of Example A, but a proportionately larger quantity of bromine was used. The presence of the dibromomethyl and tribromomethyl moiety of the compound of Examples A and B was confirmed with NMR spectra.

EXAMPLE C p-METHOXYPHENYL DIIODOMETHYL SULFONE p-Methoxyphenyl diiodomethyl sulfone was prepared by dissolving 11.5 g. (0.05 mole) of p-methoxyphenylsulfonyl acetic acid in 40 ml. of 5 percent aqueous sodium hydroxide (0.05 mole). A solution of sodium hypoiodite was prepared by adding iodine monochloride, 19.5 g. (0.12 mole) to 200 ml. 5 percent sodium hydroxide solution. The hypoiodite was added to the stirred sulfonyl acetic acid solution at room temperature and after the addition was completed, this mixture was stirred for 2 hours. It was then acidified with 22 ml. of concentrated HCl solution and stirred another 2 hours at room temperature while carbon dioxide evolved. The mixture was made alkaline with 50 percent sodium hydroxide solution and stirred for 15 minutes. The tan product was filtered off, washed with water, triturated with sodium bisulfite solution to remove color, filtered and washed again. The crude dried p-methoxyphenyl diiodomethyl sulfone weighed 18.5 g. and was crystallized from acetone-water, melting point 132–4°. Calculated for $C_8H_8I_2O_3S$: C=21.93%; H=1.84%; I=57.95%
Found:     C=21.85%; H=2.11%; I=57.97%

Other representative compounds similarly prepared and their respective melting points are:

| Compound | Melting Point °C. |
| --- | --- |
| 4-tolyl diiodomethyl sulfone | 145–149 |
| phenyl diiodomethyl sulfone | 95–98 |
| 4-tolyl dibromomethyl sulfone | 114–116 |
| 4-tolyl tribromomethyl sulfone | 147–149 |
| 4-(methyl amido)-phenyl-diiodomethyl | 214–216 |
| n-heptyl diiodomethyl sulfone | 63–67 |
| 4-aminophenyl diiodomethyl sulfone | 180–182 |
| 4-chlorophenyl diiodomethyl sulfone | 132–134 |
| 4-t-butyl-phenyl diiodomethyl sulfone | 129–130 |
| 3-tolyl diiodomethyl sulfone | 104–105 |
| 2-tolyl diiodomethyl sulfone | 123–124 |
| 4-bromophenyl diiodomethyl sulfone | 132–133 |
| 2-methyl-4-chlorophenyl diiodomethyl sulfone | 110–111 |
| alphanaphthyl diiodomethyl sulfone | 138–141 |
| 2-methyl-4-bromophenyl diiodomethyl sulfone | 114–115 |
| 3-methyl-4-bromophenyl diiodomethyl sulfone | 136–139 |
| n-butyl diiodomethyl sulfone | 38–40 |
| benzyl diiodomethyl sulfone | 154–156 |
| 2,4-dimethylphenyl diiodomethyl sulfone | 114–117 |
| 3,4-dichlorophenyl diiodomethyl sulfone | 144–146 |
| 4-chlorophenyl dibromomethyl sulfone | 112–116 |
| 4-methoxyphenyl dibromomethyl sulfone | 80–83 |
| ethyl diiodomethyl sulfone | 88–89 |
| t-butyl diiodomethyl sulfone | 99–101 |
| 4-chlorophenyl tribromomethyl sulfone | 160–162 |
| 4-methoxyphenyl tribromomethyl sulfone | 134–137 |
| benzyl iodomethyl sulfone | 171–173 |
| ethyl iodomethyl sulfone | 62–64 |
| 2-methyl-4-t-butylphenyl diiodomethyl sulfone | 127–128 |
| 2-nitro-4-methylphenyl dibromomethyl sulfone | 153–154 |
| 2-nitro-4-methylphenyl tribromomethyl sulfone | 183–186 |
| 3-tolyl tribromomethyl sulfone | 127–129 |
| 4-t-butylphenylbromomethyl sulfone | 138–139 |
| 2-nitro-4-methylphenyl iodomethyl sulfone | 132–140 |
| 4-chlorobenzyl diiodomethyl sulfone | 138–141 |
| 2-nitro-4-chlorophenyl iodomethyl sulfone | 183–184 |
| 2-nitro-4-chlorophenyl tribromomethyl sulfone | 185 |
| 4-nitrophenyl diiodomethyl sulfone | 184–186 |
| 2-methyl-4-t-butylphenyl tribromomethyl sulfone | 137–138 |
| 2-nitro-4-chlorophenyl diiodomethyl sulfone | 160–162 |
| 2-isopropylphenylbromomethyl sulfone | 147–148 |
| 2-isopropylphenyldiiodomethyl sulfone | 120–121 |
| 4-nitrophenyl tribromomethyl sulfone | 197–199 |
| 4-(2,2-dimethylpropyl)phenyldiiodomethyl sulfone | 107–109 |
| 4-chlorobenzyl iodomethyl sulfone | 219–220 |
| cyclohexyl diiodomethyl sulfone | 126–128 |
| n-pentyl diiodomethyl sulfone | 51–53 |
| n-hexyl diiodomethyl sulfone | 46–48 |
| n-propyl diiodomethyl sulfone | 45–47 |
| n-octyl diiodomethyl sulfone | 72–74 |
| 4-methyl benzyl diiodomethyl sulfone | 165–167 |
| 4-fluorobenzyl diiodomethyl sulfone | 119–121 |
| -bromobenzyl diiodomethyl sulfone | 149–151 |
| 4-methoxybenzyl diiodomethyl sulfone | 168–170 |
| 3-chlorobenzyl diiodomethyl sulfone | 182–184 |
| 3,5-dimethyl diiodomethyl sulfone | 188–190 |
| 1-phenyl-2-(diiodomethylsulfonyl)ethane | 69–71 |
| 3-bromobenzyl diiodomethyl sulfone | 192–194 |
| 2-naphthylmethyl-diiodomethyl sulfone | 172–174 |
| 1-phenyl-3-(diiodomethylsulfonyl)propane | 68–70 |
| isobutyl diiodomethyl sulfone | 64–66 |
| 3,4-dimethylbenzyl diiodomethyl sulfone | 175–184 |
| 3,3-dimethylpropyl diiodomethyl sulfone | 74–76 |
| 2,2,4,4-tetramethylbutyl diiodomethyl sulfone | 101–103 |
| 4-fluorobenzyl dibromomethyl sulfone | 115–117 |
| 3-chlorobenzyl dibromomethyl sulfone | 150–152 |
| 4-bromobenzyl dibromomethyl sulfone | 126–128 |
| 3,4-dichlorobenzyl dibromomethyl sulfone | 130–132 |
| 2,4-dichlorobenzyl dibromomethyl sulfone | 109–111 |
| 3-bromobenzyl dibromomethyl sulfone | 151–153 |
| 2-bromobenzyl dibromomethyl sulfone | 110–112 |
| 2-chlorobenzyl dibromomethyl sulfone | 107–108 |
| 4-methylbenzyl dibromomethyl sulfone | 124–126 |
| 2-methylbenzyl dibromomethyl sulfone | 118–120 |
| 3-methylbenzyl dibromomethyl sulfone | 144–146 |
| 4-nitrobenzyl dibromomethyl sulfone | 151–153 |
| 4-methoxybenzyl dibromomethyl sulfone | 125–127 |
| 2,5-dimethylbenzyl dibromomethyl sulfone | 119–121 |
| 3,4-dimethylbenzyl dibromomethyl sulfone | 118–125 |
| 1-phenyl-2-dibromomethylsulfonyl)ethane | oil |
| 1-phenyl-3-(dibromomethylsulfonyl)-propane | 55–57 |
| cyclohexyldibromomethyl sulfone | 96–98 |
| n-heptyl dibromomethyl sulfone | oil |
| n-decyldibromomethyl sulfone | 47–49 |
| n-hexadecyl dibromomethyl sulfone | 76–78 |
| 3-methylpropyldiiodomethyl sulfone | 173–174 |
| n-decyldiiodomethyl sulfone | 71–79 |

The following example illustrates the application of the compounds of this invention as a coating composition to textiles which are expected to come in contact with the ground, such as those used for sand bags, tarpaulins and tents. The test was performed in accordance with the method described in Federal Specifications, Textiles Testing, CCC-T-191b, a method which is considered to be most severe.

EXAMPLE I

Raveled strip samples were prepared from "Pure-Finish" Indian Head cotton cloth, used as a standard test fabric. The test compound was applied to the fabric from acetone solution to provide 0.5 percent pickup by the fabric. Five test strips were treated with each compound and were buried in soil exposure beds along with five untreated test strips. The soil was rich with microbial life and was maintained at a temperature of 30+ or −2° C.

After 12 days tensile strength measurements were conducted on the treated and exposed strips. The average breaking strength of the untreated unexposed fabric was also measured. The results obtained are reported in table I. The untreated exposed test strips had completely disintegrated.

TABLE I

Cotton Fabric Resistance to Microbiological Degradation

| Compound | Average Breaking Strength lbs./in. | % Strength Regained |
| --- | --- | --- |
| 4-tolyl diiodomethyl sulfone | 51.4 | 73.0 |
| 4-chlorophenyl diiodomethyl sulfone | 63.0 | 90.0 |
| 4-t-butyl-phenyl diiodomethyl sulfone | 83.00 | 100+ |
| 4-methoxyphenyl diiodomethyl sulfone | 55 | 78.0 |
| 2-methyl-4-chlorophenyl diiodomethyl sulfone | 52 | 74.0 |
| Unprotected—Exposed | 0 | |
| Untreated—unexposed | 70.2 | |
| 4-aminophenyl diiodomethyl sulfone | 55.2 | 78.0 |
| 2,4-dimethylphenyl diiodomethyl | | |

| | | |
|---|---|---|
| sulfone | 70.7 | 99.9 |
| 3,4-dichlorophenyl diiodomethyl sulfone | 68.0 | 96.0 |
| benzyl diiodomethyl sulfone | 82 | 100+ |
| cyclohexyl diiodomethyl sulfone | 74.5 | 100+ |
| n-pentyl diiodomethyl sulfone | 52.0 | 73.5 |
| n-hexyl diiodomethyl sulfone | 63.0 | 89.0 |
| n-octyl diiodomethyl sulfone | 71.0 | 100 |
| 4-bromobenzyl diiodomethyl sulfone | 67.0 | 94.4 |
| 4-methoxybenzyl diiodomethyl sulfone | 67.0 | 94.4 |
| 1-phenyl-3-(diiodomethylsulfonyl)propane | 71.5 | 100+ |
| 3,4-dimethylbenzyl diiodomethyl sulfone | 58.0 | 81.7 |
| Untreated Exposed | 0 | |
| Untreated unexposed | 71 | |

It will be observed that all of the listed compounds enabled the fabric to retain about 75 percent of its breaking strength. For many of the compounds, the breaking strength of the treated fabric at the conclusion of the test was more than 90 percent of its initial value and for some of the compounds, the strips evidenced no measurable loss of strength.

The compounds named in table I, with the possible exception of 4-aminophenyldiiodomethyl sulfone, which is photosensitive, are particularly desirable for this application because the compounds are all colorless whereas other compounds often employed for this purpose, such as copper 8-hydroxyquinolinate which is green, impart a color to the fabric which is undesirable for many applications.

The preservation of exterior latex paint films against microbial attack is a matter of great importance and is a particularly several problem in the Southern latitudes. To be suitable for such an application, the protective compound, generally a fungicide must be nontoxic to humans and animals, is preferably colorless, and in any event must not change color with time, must resist leaching and photo decomposition. Desirably it possesses low volatility at a temperature on the order of 150–160° F.

The following example illustrates the preparation of a latex paint containing a compound of this invention and its performance in affording protection to the coating film applied from such paint.

EXAMPLE II-A

A white latex paint is prepared according to the following recipe.

| Pigment—39.7% | Vehicle—60.3% | |
|---|---|---|
| TiO₂ 10.9% | Polyvinylacetate copolymer | 15.4% |
| CaCO₃ 21.8% | Water 84.6% | |
| Silicates 67.3% | | |

To 4½ ml. of this paint is added 0.5 ml. of a dimethylformamide solution containing 5 percent by weight of the test compound. A 2.2 cm. filter paper disc is dipped into the paint and the excess paint is removed by blotting. The samples are conditioned by heating at 65° C. for 8 hours and are then immersed in slowly running tap water for 48 hours at 25° C.

The conditioned paint specimens are placed firmly on agar nutrient medium and 0.3 ml. of an inoculum of *Aspergillus oryzae*—ATCC 10196 is spread evenly over the surface of the specimen and nutrient medium. The inoculated specimens are incubated in a humidity box at 28° C. for 7 days. A control specimen is prepared using phenylmercuric acetate as the preservative compound. A the end of the incubation period, growth of the mold on the samples is compared with that on the control. The results are recorded and are as shown in table II–A.

TABLE II-A

| Compound | Activity |
|---|---|
| 4-chlorophenyl diiodomethyl sulfone | Equivalent to control |
| 4-t-butyl-phenyl diiodmethyl sulfone | Equivalent to control |
| 2-methyl-4-chlorophenyl diiodmethyl sulfone | Equivalent to control |
| alphanaphthyl diiodomethyl sulfone | Equivalent to control |
| 3,4-dichlorophenyl diiodomethyl sulfone | Equivalent to control |
| 2-methyl-4-t-butylphenyl diiodmethyl sulfone | Equivalent to control |
| 4-(2,2-dimethylpropyl)phenyldiiodomethyl sulfone | Equivalent to control |
| n-octyl diiodomethyl sulfone | Equivalent to control |
| 4-bromobenzyl diiodomethyl sulfone | Equivalent to control |
| 4-methoxybenzyl diiodmethyl sulfone | Equivalent to control |
| 1phenyl-3-(diiodmethylsulfonyl)propane | Equivalent to control |
| 3,4-dimethylbenzyl diiodmethyl sulfone | Equivalent to control |

The above results demonstrate that the dihalomethylsulfones are excellent paint preservatives. This property is further illustrated in the following example, wherein a film of the latex paint containing a compound of this invention was exposed to severe outdoor test conditions in a southern latitude.

EXAMPLE II-B

A latex exterior paint was prepared according to the following recipe.

Water—150 pounds
Potassium tri-polyphosphate—1.0 pound (dispersant)
Triton X–100—4.0 pounds (wetting agent)

TABLE II-B.—PAINT WEATHERING TEST

| | 3 months | | | | 6 months | | | |
|---|---|---|---|---|---|---|---|---|
| Compound | Color change | Dirt retention | Mildew | General appearance | Color change | Dirt retention | Mildew | General appearance |
| 4-tolyl diiodomethyl sulfone | Bl | Sl | Sl | Good | Sl | Sl | Mod | Fair. |
| n-Heptyl diiodomethyl sulfone | Bl | Sl | Tr | V. good | Bl | Mod | Mod | Do. |
| 4-t-butyl-phenyl diiodomethyl sulfone | Bl | Sl | Mod | Fair | Bl | Sl | Mod | Poor. |
| 4-bromophenyl diiodomethyl sulfone | Bl | Sl | Tr | V. good | Bl | Sl | Tr | Good. |
| 4-methoxyphenyl diiodomethyl sulfone | Bl | Sl | None | Exc | Bl | Sl | Sl | V. good. |
| 2-methyl-4-chlorophenyl diiodomethyl sulfone | Bl | Sl | do | Exc | Bl | Sl | Sl | Do. |
| Alphanaphthyl diiodomethyl sulfone | Bl | Sl | Mod | Poor | Bl | Sl | Mod | Fair. |
| 3-methyl-4-bromophenyl diiodomethyl sulfone | Bl | Sl | Mod | do | Bl | Sl | Mod | Do. |
| 2,4-dimethylphenyl diiodomethyl sulfone | Bl | Sl | Tr | V. good | Bl | Sl | Mod | Good. |
| Benzyl diiodomethyl sulfone | Bl | Sl | None | Exc | Bl | Sl | Sl | V. good. |
| 2-methyl-4-t-butylphenyl diiodomethyl sulfone | Bl | Sl | Sl | Fair | Bl | Sl | Mod | Fair. |
| 4-chlorobenzyl diiodomethyl sulfone | Bl | Sl | Tr | V. good | Bl | Sl | Mod | Do. |
| 2-isopropylphenyldiiodomethyl sulfone | Bl | Sl | Mod | Fair | Bl | Sl | Mod | Do. |
| 4-chlorophenyl diiodomethyl sulfone | Bl | None | None | Exc | Bl | Sl | Mod | V. good. |
| Control: | | | | | | | | |
| None | | Pro | Sl | Pro | V. poor | Mod | Mod | Mod | Poor. |
| Mercurial | | Pro | Sl | Mod | Poor | Pro | Mod | Mod | Do. |

CODE:
Color change=No change, Bleached, Slight discoloration, Moderate discoloration, Pronounced discoloration.
Dirt Retention=None, Slight, Trace, Moderate, Pronounced.
Mildew=None, Slight, Trace, Moderate, Pronounced.
General appearance=Excellent, Very good, Good, Fair, Poor, Very poor.

Titanium Dioxide—200 pounds (prime pigment)
325 Grade talc—150 pounds (extender)
Propylene glycol—30 pounds (wet edge agent)
Cellosize QP 15,000—4.0 pounds (thickener and protective colloid)
Water—150 pounds
Union Camp. copolymer 524—325 pounds (vehicle)
Daxad—2.0 Pounds (dispersant)
Texanol—4.0 pounds (coalescing agent)

Triton X—Wetting Agent is a octylphenoxypolyethoxy ethanol composition supplied by Rohm and Haas Company.

rows of treated seeds were planted 1 inch apart, one-quarter inch deep, 20 seeds per row. Ten barley seeds infected with R. solani, a soil borne plant pathogen, were planted one-quarter inch deep between the two rows of treated seed. The flats were placed individually into plastic bags and sealed and cultured until the seedlings emerge. After emergence, the flats are cultured at 68° F. until the test is completed 7 to 10 days later. A sterile check and untreated check were also run.

The flats were then read for percent germination, and percent survival of those which germinated. The results are listed in Table III.

TABLE III.—COATED SEEDS—GERMINATION AND SURVIVAL

| Compound | 10 p.p.m. | | 20 p.p.m. | | 45 p.p.m. | | 90-125 p.p.m. | | Sterile check | | Untreated check | |
| --- | --- | --- | --- | --- | --- | --- | --- | --- | --- | --- | --- | --- |
| | G | S | G | S | G | S | G | S | G | S | G | S |
| 4-tolyl diiodomethyl sulfone | 84 | 100 | 89 | 100 | 85 | 100 | 78 | 100 | 84 | 100 | 27 | 31 |
| 4-acetamido-phenyl diiodomethyl sulfone | 86 | 100 | 89 | 100 | 73 | 100 | | | 84 | 100 | 27 | 31 |
| 4-chlorophenyl diiodomethyl sulfone | 81 | 100 | 81 | 100 | 83 | 100 | | | 77 | 100 | 67 | 35 |
| 4-t-butyl-phenyl diiodomethyl sulfone | 78 | 100 | 86 | 100 | 86 | 100 | | | 77 | 100 | 67 | 35 |
| 4-bromophenyl diiodomethyl sulfone | 86 | 100 | 87 | 100 | 77 | 100 | | | 83 | 100 | 18 | 46 |
| 4-methoxyphenyl diiodomethyl sulfone | 83 | 100 | 85 | 100 | 83 | 100 | | | 83 | 100 | 18 | 46 |
| 2-methyl-4-chlorophenyl diiodomethyl sulfone | 86 | 100 | 93 | 100 | 86 | 100 | | | 84 | 100 | 27 | 31 |
| Alphanaphthyl diiodomethyl sulfone | 80 | 100 | 76 | 95 | 81 | 100 | | | 76 | 100 | 46 | 16 |
| 2-methyl-4-bromophenyl diiodomethyl sulfone | | | | | | | 78 | 85 | 76 | 80 | 41 | 57 |
| 3,4-dichlorophenyl diiodomethyl sulfone | | | | | 78 | 100 | | | 67 | 64 | 22 | 5 |
| 4-methoxyphenyl tribromomethyl sulfone | | | | | 58 | 85 | | | 58 | 100 | 30 | 29 |
| 2-methyl-4-t-butylphenyl diiodomethyl sulfone | | | | | 48 | 53 | | | 58 | 100 | 30 | 29 |
| 2-nitro-4-methylphenyl tribromomethyl sulfone | 60 | 85 | 66 | 90 | 66 | 84 | | | 60 | 100 | 36 | 27 |
| 2-nitro-4-chlorophenyl iodomethyl sulfone | | | | | 56 | 86 | | | 67 | 64 | 22 | 5 |
| 4-nitrophenyl tribromomethyl sulfone | | | | | 82 | 95 | | | 67 | 64 | 22 | 2 |
| 4-fluoro-benzyl dibromomethyl sulfone | | | | | 43 | 100 | | | 68 | 100 | 40 | 21 |
| 3-methylbenzyl dibromomethyl sulfone | | | | | 57 | 91 | | | 68 | 100 | 40 | 21 |
| 4-methoxybenzyl dibromomethyl sulfone | | | | | 55 | 95 | | | 68 | 100 | 40 | 21 |
| 3,4-dimethylbenzyl dibromomethyl sulfone | | | | | 56 | 88 | | | 68 | 100 | 40 | 21 |
| Phenyl-3-(dibromomethylsulfonyl) propane | | | | | 68 | 100 | | | 68 | 100 | 40 | 21 |
| Cyclohexyldibromomethyl sulfone | | | | | 50 | 98 | | | 68 | 100 | 40 | 21 |
| n-Heptyl dibromomethyl sulfone | | | | | 48 | 92 | | | 68 | 100 | 40 | 21 |
| n-Hexadecyl dibromomethyl sulfone | | | | | 35 | 39 | | | 68 | 100 | 40 | 21 |

Code.—G = Germinated; S = Survived.

Cellosize QP is hydroxyethylcellulose available from Union Carbide Company. Daxad dispersant comprises polymerized sodium and potassium salts of alkylnapthalene sulfonic acids manufactured by Dewey and Chemical Company. Texanol is an ester-alcohol trimethylpentadiolmonoiso butyrate available from Eastman Chemical Products Inc. The copolymer vehicle is a polyvinyl acetate dibutyl fumarate copolymer emulsion.

To the foregoing paint formula was added one percent by weight of a test compound. Two coats were then applied to a Southern Yellow pine substrate and exposed to a direct weathering test in South Florida on test racks set at an angle of 45° and facing South. For comparison, panels were coated with paint without preservative and with paint containing 1 percent phenylmercuric acetate. The panels were evaluated after 3 months and again after 6 months for color change, dirt retention, presence of mildew and general overall appearance. Results were as shown in Table II-B.

From the foregoing, it is evident that a coating composition embodying a compound of this invention endures exposure well and protects the substrate. It is of interest to note that in two instances the general appearance of the panels improved between the 3 month and 6 month readings.

The following example illustrates protection afforded to seeds and seedlings by coating seeds with compounds of this invention.

EXAMPLE III

Seeds were coated by first distributing a predetermined amount of seed treating material as evenly as possible over the inner surface of a glass treatment jar. Flax seeds were then placed into the treatment jar and the seeds were tumbled by hand for 1 minute and mechanically for 5 additional minutes. The quantity of compound applied was from 10 parts per million to about 125 parts per million of seed.

A seed bed was prepared from 1800 grams of air dry sand mixed with 80 ml. of tap water until the mixture appeared uniformly moist. The moist sand was placed into flats and two These results indicate that in most cases, the percent germination and percent survival approximate those obtained with the sterile check. It will be further noted that the treated seeds produced two to three times the number of surviving seedlings at the termination of the test as did the untreated check.

We claim:

1. A method of protecting potential agricultural and industrial hosts against fungi and bacterial attack comprising coating said host with a compound of the formula

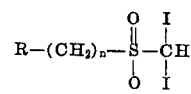

wherein n is an integer from zero to four and R is selected from the group consisting of alkyl, phenyl, loweralkylphenyl, monohalophenyl, polyhalophenyl, nitrophenyl, halonitrophenyl, nitroloweralkylphenyl, haloloweralkylphenyl, or polyloweralkylphenyl.

2. A coating composition adapted to protect potential agricultural and industrial hosts against fungi and bacterial attack, said composition comprising from about 0.1 to about 2.0 percent by weight of a compound of the formula

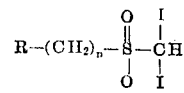

wherein n is an integer from zero to four and R is selected from the group consisting of alkyl, phenyl, loweralkylphenyl, monohalophenyl, polyhalophenyl, nitrophenyl, halonitrophenyl, nitroloweralkylphenyl, haloloweralkylphenyl, or polyloweralkylphenyl.

3. The method of claim 1 wherein the R substituent is halophenyl.
4. The method of claim 1 wherein R is parachlorophenyl.
5. The method of claim 1 wherein R is parabromophenyl.
6. The method of claim 1 wherein R is 3,4-dichlorophenyl.

7. The method of claim 1 wherein the R substituent is alkylphenyl.

8. The method of claim 1 wherein R is paratolyl.

9. The method of claim 1 wherein R is paratertiarybutylphenyl.

10. The method of claim 1 wherein R is 2-methyl-4-tertiarybutylphenyl.

11. The method of claim 1 wherein the R substituent is n-octyl.

12. The method of claim 1 wherein the R substituent is paraanisyl.

13. The method of claim 1 wherein the R substituent is cyclohexyl.

14. The method of claim 1 wherein the R substituent is 2-naphyl.

15. The method of claim 1 wherein the R substituent is 2-methyl-4-chlorophenyl.

16. A coating composition according to claim 2 wherein the carrier is a latex paint and the compound is present in an amount from about 0.1 percent to about 2 percent.

17. A coating composition according to claim 2 adapted to protect a textile potential host wherein the carrier is a volatile solvent.

18. A coating composition according to claim 2 adapted to protect viable seed potential host wherein the carrier is selected from the group consisting of a volatile solvent and an inert powder.

19. A coating composition according to claim 2, wherein the compound is present in an amount sufficient to produce a biocidal effect.

20. A composition according to claim 2 wherein R is phenyl.

21. An industrial material comprising a potential host for bacterial and fungal attack having at least a portion of its surface protected by a coating composition according to claim 2 whereby said host is rendered resistant to attack by a member of the class consisting of fungi and bacteria.

22. An industrial material according to claim 21 wherein the potential host is cotton fabric.

23. An industrial material according to claim 21 wherein the potential host is a latex paint film and its supporting substrate.

24. The method of claim 1 wherein said composition is a liquid and including the step of drying the composition whereby the compound is adhered to the host.

UNITED STATES PATENT OFFICE
CERTIFICATE OF CORRECTION

Patent No. 3,615,745                    Dated October 26, 1971

Inventor(s) Aldo J. Crovetti and Donald S. Kenney

It is certified that error appears in the above-identified patent and that said Letters Patent are hereby corrected as shown below:

In Claims 1 and 2, please delete the formula

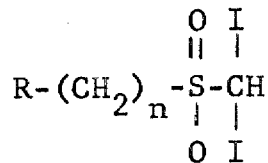

and substitute therefor

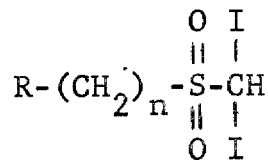

Signed and sealed this 25th day of April 1972.

(SEAL)
Attest:

EDWARD M. FLETCHER, JR.         ROBERT GOTTSCHALK
Attesting Officer               Commissioner of Patents